United States Patent

[11] 3,623,075

[72] Inventors Stephen M. Bench
Rolling Meadows;
Thomas J. Rollins, Arlington Heights, both of Ill.

[21] Appl. No. 866,999
[22] Filed Oct. 16, 1969
[45] Patented Nov. 23, 1971
[73] Assignee Motorola, Inc.
Franklin Park, Ill.

[54] ASYNCHRONOUS DATA DECODER
4 Claims, 2 Drawing Figs.

[52] U.S. Cl. 340/347DD, 178/66, 178/68, 329/104, 325/321
[51] Int. Cl. H04l 27/24
[50] Field of Search 178/66–68; 325/320–322, 38; 329/104; 340/345, 347

[56] References Cited
UNITED STATES PATENTS
3,341,779 9/1967 Kedson 329/104 X
3,510,780 5/1970 Buehrle 325/321

*Primary Examiner*—Maynard R. Wilbur
*Assistant Examiner*—Charles D. Miller
*Attorney*—Mueller & Aichele

ABSTRACT: Digital information to be decoded is transmitted over a voice band transmission medium as a sequence of half-cycles of tone of different frequencies, with different frequency tones being utilized for mark and space data bits. Only a half-cycle is required for each data bit with a phase reversal occurring at each data bit. The incoming signals are transformed into a sequence of zero crossings with the pulse interval time duration between these zero crossings being compared with a local frequency standard. At the end of each pulse interval, the decision of whether or not a mark or space has been received is determined in accordance with the count stored in a counter driven by the local frequency standard. The counter then is reset, storing a new count during the next half-cycle signal received.

Inventors
STEPHEN M. BENCH
THOMAS J. ROLLINS
BY Mueller, Aichele & Rauner
ATTYS.

ASYNCHRONOUS DATA DECODER

BACKGROUND OF THE INVENTION

Many prior art types of transmitters and receivers exist for receiving and decoding binary information which is transmitted in various forms over voice band channels. Systems which have been employed include systems using amplitude-modulated signals, phase-modulated signals, and frequency shift signals. Other systems employ pulse width modulation (P.W.M.) in which the digital information is processed on a time average basis.

These prior art systems generally require the use of a synchronized internal clock or oscillator in order to decode the received information. In the case of frequency shift keying systems, multiple cycles of two or more tones are used to represent the two or more binary conditions of the input signal. In order to provide a method of recovering a system clock from received data in a frequency shift keying system, a return to zero type of encoding may be employed, with a third pulse or tone being used to control the reading of the previously transmitted tone. This type of a system permits the recovery of a clock from a received data but limits the available signaling speed to approximately half of its capability. In addition, most of the prior art systems require the same pulse width or time interval for transmitting binary data bits of both types.

It is desirable to provide a high bit rate asynchronous data decoder for use with a voice band transmission medium, permitting a higher bit rate to be transmitted over the voice band than is possible with the prior art systems.

SUMMARY OF THE INVENTION

Accordingly it is an object of this invention to provide an improved asynchronous data decoder.

It is an additional object of this invention to provide an asynchronous decoder for decoding a train of data bits which has been encoded as a sequence of alternating opposite phases of half-cycles of waves of different frequencies, with the waves utilized to represent each of the different data conditions being of different frequencies.

It is a further object of this invention to provide an asynchronous data decoder capable of reconstructing a system clock from received data employing only two different frequencies to represent the two different binary conditions of an incoming train of binary data bits.

In accordance with a preferred embodiment of this invention, a system for decoding a train of data bits encoded as a sequence of alternating opposite phases of half-cycles of waves of at least two different frequencies, a different frequency for each of the different data conditions, includes means for producing a sequence of data pulses representative of the sequence of phase reversals in the encoded train of data bits. Timing means then responds to the time interval between successive data pulses to produce outputs corresponding to each of the different data conditions in the input train of data bits.

DETAILED DESCRIPTION

Figure 1:
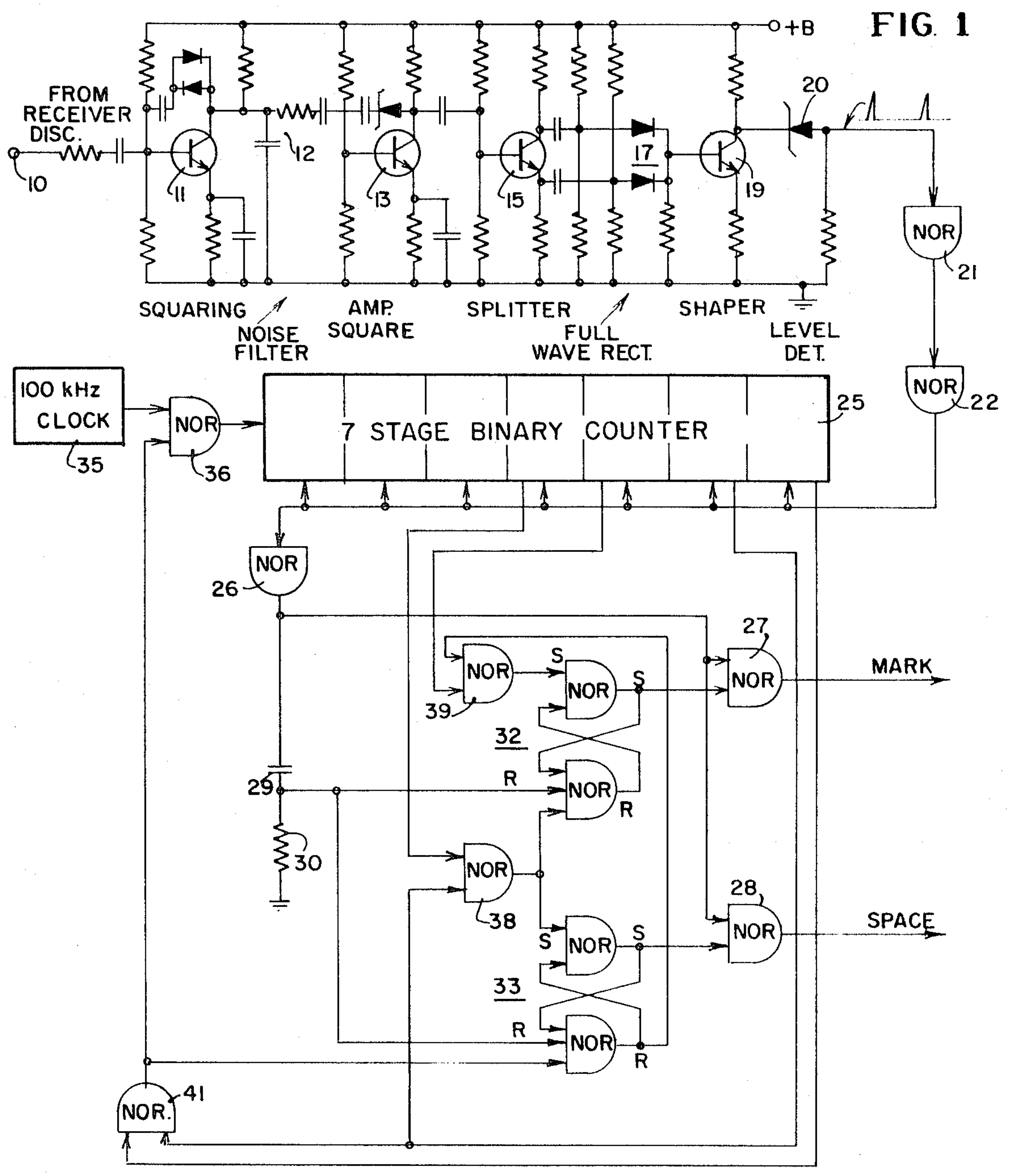
FIG. 1 is a schematic diagram of a preferred embodiment of the invention.

Referring now to the drawing, binary data to be decoded is encoded in the form of alternating opposite phases of half-cycles of audio tones of two different frequencies. These two frequencies should be relatively widely separated but need not be harmonically related to one another. The encoded data is received by a voice band radio receiver (not shown) which may be of any conventional type, with the output from the receiver discriminator being applied to an input terminal 10 of the decoding circuit. The input signal obtained from the receiver discriminator and applied to the terminal 10 is shown in waveform A of FIG. 2. From waveform A it may be seen that each data bit causes a phase reversal in the incoming signal which resembles, more or less, a sine wave signal input, with each half-cycle of the sine wave representing a different data bit. As shown in waveform A the "space" data bits are of a frequency which is approximately one-half that of the "-mark" data bits. This relationship is used for purposes of illustration only; and in a preferred form of the invention which has been operated, the space data bits have a duration of 0.64 msec., while the mark data bits have a duration of 0.24 msec.

Each incoming data bit is represented by a single half-cycle of an audio frequency tone as transmitted over the transmission medium. This should be contrasted with conventional types of tone detectors or decoders which generally require a few cycles of tone to determine the incoming frequency or to "synchronize"the system for decoding the incoming information.

The input signal (waveform A) applied to the terminal 10 from the receiver discriminator is applied to the base of an NPN squaring amplifier 11. The output of the squaring amplifier 11 is passed through a noise filter 12 and then is applied to the base of a second squaring amplifier 13, which produces on its collector a squared signal output as illustrated in waveform B. The signal appearing on the collector of the transistor 13 is not a perfect square wave, due to the rise and fall times required to convert the generally sinusoidal input signal to the squared signal. For all practical purposes, however, the output of the squaring amplifier 13 is a square wave signal in the form of a sequence of half-cycle square waves of two different frequencies, corresponding to the two frequencies of the audio tones in which the input data is encoded.

The squared signal obtained from the collector of the transistor 13 is applied to the base of an NPN phase splitter transistor 15, producing outputs on its collector and emitter which are applied to the two diodes of a full wave rectifier 17. The rectified signal obtained from the full wave rectifier 17 is a sequence of negative-going pulses (waveform C of FIG. 2), with the time interval between successive pulses being determined by the time interval between phase reversals of the squared signal shown in waveform B. These pulses are applied to the base of a normally conductive NPN shaper transistor 19 which is rendered momentarily nonconductive by each of the rectified pulses applied to its base. Each time that the transistor 19 is rendered nonconductive, a positive pulse appears on its collector and is passed by a level detector in the form of a Zener diode 20.

The pulses appearing on the anode of the Zener diode 20 are spaced by two different time intervals corresponding to the two different time intervals occurring between successive zero crossings of the input waveform A, with a longer time interval occurring between pulses at the output of the Zener diode 20 for an input "space" signal and a shorter time interval occurring between the pulses at the output of the Zener diode 20 for each "mark" signal applied to the input terminal 10 from the receiver discriminator. These positive pulses are passed through a series-connected pair of single input NOR-gates 21 and 22, providing a double inversion of the pulses and providing isolation of the level detector 20 from the remainder of the circuit.

Each of the positive-going pulses appearing at the output of the NOR-gate 22 is applied to all of the stages of a seven-stage binary counter 25 to reset the binary counter to a zero count. These pulses also are applied through a NOR-gate inverter 26 to produce a negative readout pulse applied to a pair of readout NOR-gates 27 and 28, with the outputs of the gates 27 and 28 corresponding, respectively, to mark and space decoded information for the previous half-cycle of received information. This same negative-going pulse from the output of the NOR-gate 26 is differentiated in a differentiating circuit, consisting of a capacitor 29 and a resistor 30, to provide a positive-going trigger pulse upon termination of the negative pulse at the output of the NOR-gate 26, with the positive trigger pulse being applied to the reset inputs of a pair of NOR-gate bistable multivibrator flip-flops 32 and 33 to place the flip-flops in the reset state of operation. The NOR-gate flip-flop 32 and 33 are used to enable the output NOR-gates 27 and 28, respectively, whenever the NOR-gate flip-flops 32 and 33 are placed in the set state of operation.

At this time, assume the circuit is in its reset state of operation ready to begin determination or decoding of the next data bit received from the receiver discriminator and applied to the input terminal 10. In order to do this, a local frequency standard in the form of a high-frequency clock 35, shown producing clock pulses at a rate of 100 kHz., is used in conjunction with the counter 25 for comparing the pulse interval time duration with the local frequency standard 35. The output pulses from the clock 35 are applied through a normally enabled NOR-gate 36 the output of which produces a train of positive-going trigger pulses to the seven-stage binary 25 at the clock rate frequency. Thus, the seven-stage binary counter 25 commences counting the clock pulses obtained from the output of the clock 35.

When the flip-flops 32 and 33 are in their reset states of operation, the reset outputs (R) are relatively low or negative, while the set outputs (S) are relatively high or positive. Thus, any NOR gate connected to a reset output (R) at this time is enabled while NOR gates connected to a set output (S) are disabled, as is well known. The outputs of the seven-stage binary counter 25 are normally high or positive thereby disabling any NOR gates to which these outputs are supplied. When a particular count corresponding to an output from the binary counter 25 is attained by the stepping of the counter, that output goes low for the length of time that such a count is present in the binary counter 25.

The outputs of the fourth and sixth stages of the binary counter are connected as inputs to a mark/space decision NOR-gate 38. Since both of these outputs are normally high or positive, the output of the NOR-gate 38 is low. When the counter reaches a count of eight, the output from the fourth stage goes low or negative, but the NOR-gate 38 still has a high or positive input applied to its other input from the sixth stage of the counter, so that this count has no affect on the operation of the NOR-gate 38 at this time. The NOR-gate 38 is operated only when the sixth and fourth stages of the binary counter both are low, which occurs when a count of forty is attained by the counter 25.

A mark decision NOR-gate 39 is connected to supply a set trigger input to the NOR-gate flip-flop 32, with the output of the NOR-gate 39 normally being low or negative, so that it has no affect on the flip-flop 32. The NOR-gate 39, however, is enabled at this time by the negative or low reset output of the flip-flop 33; and when a count of 16 is reached by the binary counter 25, the output from the fifth stage of the binary counter goes low. This fifth stage output is applied to the input of the NOR-gate 39, which then applied a positive trigger pulse to the set input of the NOR-gate flip-flop 32, switching the flip-flop 32 to its set state of operation, whereupon the NOR-gate 27 is enabled by a low or negative input applied thereto from the flip-flop 32.

Figure 2:
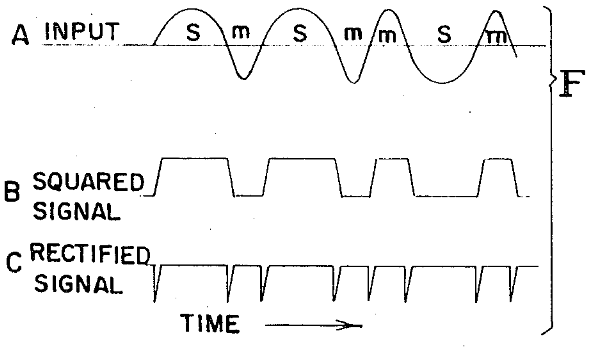
FIG. 2 shows waveforms useful in explaining the operation of the circuit shown in FIG. 1.

Assuming that the waveform applied to the input terminal 10 is that shown in waveform A of FIG. 2, the first half-cycle pulse which is received is a space pulse having a duration of 0.64 msec. As a consequence, clock pulses continue to be applied from the output of the NOR-gate 36 to the seven-stage binary counter 25, since the next data pulse from the NOR-gate 22 does not occur until 0.64 msec. after the seven-stage binary counter 25 commenced counting.

When the count of 40 is reached, the outputs of both the fourth and sixth stages of the counter 25 go negative; and the NOR-gate 38 produces a positive or high pulse at its output. This pulse is applied to the set input of the NOR-gate flip-flop 33 causing it to be placed in its set state of operation. This same output pulse from the NOR-gate 38 is used to reset the flip-flop 32 into its reset state of operation, thereby causing a high output to be applied to the input of the NOR-gate 27, disabling that NOR gate. The set state of operation of the flip-flop 33, however, causes the NOR-gate 28 to be enabled. At the same time, a high output is obtained from the reset output (R) of the flip-flop 33 to disable the NOR-gate 39, so that no further set pulses can be applied to the NOR-gate flip-flop 32.

Clock pulses from the clock 35 and passed by the NOR-gate 36 continue to step the binary counter 25, but after 64 clock pulses (0.64 msec.), a data pulse corresponding to a phase reversal in the input signal, is obtained from the output of the NOR-gate 22 and resets the binary counter 25. The negative-going pulse obtained from the NOR-gate 26 is applied to the inputs of both of the NOR-gates 27 and 28 causing a positive-going output pulse to be obtained from the output of the NOR-gate 28, indicating that the first-received data bit is a space data bit. The output pulse from the NOR-gate 26 is blocked by the NOR-gate 27, since a high output is applied to the other input of the gate 27 from the set output of the flip-flop 32. The bistable multivibrators 32 and 33 then are reset to the state of operation upon termination of the negative pulse from the output of the NOR-gate 26, as described previously, and the cycle of operation is repeated.

The next half-cycle wave in waveform A applied to the terminal 10 is a mark pulse. When the binary counter 25 reaches a count of 16, the flip-flop 32 is set to its set state by the output pulse passed by the NOR-gate 39 in the manner described above. The next zero crossing of the input waveform A is detected by the signal shaping circuit 0.24 msec. after the system was reset by the last pulse appearing at the output of the NOR-gate 22. Thus, the second pulse at the output of the NOR-gate 22 occurs before the NOR-gate 38 has an opportunity to pass an output pulse, so that the next read pulse passed by the NOR-gate 26 produces a positive-going transition at the output of the NOR-gate 27, indicative of a received mark data bit.

Since the bistable multivibrator 33 remains set to its reset state of operation at this time, the NOR-gate 28 is not enabled and no output pulse is obtained on the space lead connected to the output of the NOR-gate 28. Once again, the system is reset, and the foregoing sequence of operation is repeated for each of the half-cycles of waves received from the receiving discriminator and applied to the input terminal 10. The determination of whether or not the data bit received over the previous half-cycle is a mark or a space data bit is controlled by the operation of the NOR-gate 38. If the received signal phase reversal occurs before an output pulse is obtained from the NOR-gate 38, the decision is made that the received data bit was a mark. If the output pulse from the NOR-gate 22 occurs after operation of the NOR-gate 38, the decision is made that the received data bit for the previous half-cycle was a space.

In the event that failure of the receiving equipment should occur so that no further pulses are obtained from the output of the NOR-gate 22, or whenever the received data train terminates so that the alternating waveform no longer is applied to the terminal 10 from the discriminator of the receiver, it is desirable to terminate operation of the counter and to inhibit both of the NOR-gates 27 and 28 from providing further output pulses. To accomplish this, a NOR-gate 41 is provided, having inputs obtained from the sixth and seventh stages of the binary counter 25.

In the illustration of the received waveform which has been discussed, the duration of the half-cycle wave defining a received space pulse or data bit is nominally 0.64 msec., with the mark/space decision being made 0.40 msec. after the previous phase reversal or pulse transition indicated at the output of the NOR-gate 22. As a consequence, at any reasonable time after 0.64 msec. if no phase reversal has been detected to provide an output pulse from the NOR-gate 22, it may be assumed that transmission has terminated.

In order to ascertain whether or not transmission has terminated in this manner, the NOR-gate 41 is enabled to pass a positive output pulse when a count of 96 is first reached by the binary counter 25. At the count of 96, the NOR-gate 41 has negative inputs applied to both of its inputs causing a positive output pulse to be obtained, and this pulse is applied to the reset input of the NOR-gate bistable multivibrator 33, causing it to be set to its reset state. In this state, the output of the bistable multivibrator 33 applied to the NOR-gate 28 becomes positive so that both the NOR-gates 27 and 28 have low outputs at this time, due to the fact that the bistable multivibrator 32 previously was set to its reset state by operation of the NOR-gate 38 at count 40.

The positive output of the NOR-gate 41 also is applied to an input of the NOR-gate 36, forcing the output of the NOR-gate 36 to be low, thereby inhibiting the passage of any further clock pulses by the NOR-gate 36. Operation of the binary counter 25 then terminates until the next pulse is obtained from the output of the NOR-gate 22. This pulse then resets the binary counter 25. When the binary counter 25 is reset by an output pulse from the NOR-gate 22, the output of the NOR-gate 41 automatically reverts to a low output, enabling the NOR-gate 36 so that operation of the decoder resumes.

The outputs of the NOR-gates 27 and 28 which are indicative of the two binary conditions, which have been designated for purposes of description as "mark" and "space," may be utilized to reconstruct a binary data train by driving the two inputs of a further bistable multivibrator, with the output of this bistable multivibrator being applied to a shift register or the like for storage or utilization of the data. The outputs of the NOR-gates 27 and 28 provide accurately decoded binary information from the composite input signal of half-cycle audio tones of the two different frequencies chosen for transmitting the binary data.

This system provides for a very high bit rate of data information, due to the fact that it is not necessary to transmit a synchronizing pulse or clock information along with the data received by the system. This constitutes the basic difference between the system described above and a simple nonreturn to zero frequency shift keying (NRZ–FSK) tone decoder. Although only two tones are employed to transmit the data to the receiver, a system clock is provided by the system without resorting to the use of some synchronized internal oscillator. There 100 kHz. clock 35 with the incoming data.

It should be noted that the system may be adapted to a multilevel system by employing additional half-cycle tones of different frequencies and by expanding the decoder portion of the circuit shown in FIG. 1 to differentiate between the different pulse widths of these different tone, so that multiplexing of two or more binary data trains or the decoding of multilevel coded data may be accomplished by the system. The operation of these expanded versions of the circuit, however, is basically the same as that described for decoding binary data.

We claim:

1. A system for decoding a train of binary data bits encoded as a sequence of alternating opposite phases of half-cycles of waves of two different frequencies, half-cycles of waves of one frequency corresponding to one binary condition and half-cycles of waves of another frequency corresponding to the other binary condition, each binary data bit being represented by a single half-cycle wave including in combination:

means responsive to the encoded train of binary data bits for producing a sequence of data pulses representative of the sequence of phase reversals of the half-cycles waves in the encoded train of binary data bits;

clock means producing a sequence of clock pulses at a frequency greater than the highest frequency of the waves representing the two binary conditions in the encoded train of binary data bits;

counter means reset to an initial count with each data pulse and responsive to the clock pulses for producing at least a first output signal corresponding to a first count of clock pulses and a second output signal corresponding to a second count of a higher number of clock pulses;

first bistable means having set and reset states of operation;

second bistable means having set and reset states of operation;

means responsive to the first output signal of the counter means for driving the first bistable means to its set state of operation;

means responsive to the second output signal of the counter means for driving the second bistable device to its set state of operation and for driving the first bistable device to its reset state of operation;

first output gating means coupled with the first bistable device and being enabled by the first bistable device in its set state of operation;

second output gating means coupled with the second bistable device and being enabled by the second bistable device in its set state of operation; and means responsive to each data pulse for producing an output pulse from the enabled one of the first and second output gating means and for resetting the first and second bistable devices to the reset states.

2. The combination according the claim 1, wherein the counter means is a binary counter set to a count of zero by the means responsive to each data pulse and wherein the first output signal of the binary counter is produced in a time interval less than the time interval required for one-half cycle of the wave of the highest frequency used to represent one of the two binary conditions and wherein the second output signal of the binary counter is produced in a time interval which is greater than the time interval for one-half cycle of said wave used to represent said one of the two binary conditions and which is less than the time interval for one-half cycle of the wave used to represent the other of the two binary conditions in the encoded sequence of binary data bits.

3. The combination according to claim 2 further including means responsive to the second bistable device in its set state of operation for inhibiting the driving of the first bistable device to its set state of operation.

4. The combination according to claim 1 further including a third output signal from the counter means, the third output signal corresponding to a count of clock pulses greater than the count of clock pulses required to produce the second output, the time interval required for the counter means to produce the third output signal after the initial count being greater than the time interval for one-half cycle of the wave used to represent said other of the two binary conditions in the encoded sequence of binary data bits; and means responsive to the third output signal of the counter means for resetting the second bistable device to the reset state and for inhibiting the application of further clock pulses to the input of the counter means.

* * * * *